Sept. 29, 1959 A. T. KUNKEL Re. 24,704

METAL WINDOW

Original Filed May 3, 1952 5 Sheets-Sheet 1

INVENTOR.
ALOYSIUS T. KUNKEL
BY
William Cleland
ATTORNEY

METAL WINDOW

Original Filed May 3, 1952 5 Sheets-Sheet 2

INVENTOR.
ALOYSIUS T. KUNKEL
BY William Cleland
ATTORNEY

METAL WINDOW

Original Filed May 3, 1952 5 Sheets-Sheet 3

INVENTOR.
ALOYSIUS T. KUNKEL
BY
William Cleland
ATTORNEY

INVENTOR.
ALOYSIUS T. KUNKEL
BY William Oblad
ATTORNEY

METAL WINDOW

Original Filed May 3, 1952 5 Sheets-Sheet 5

INVENTOR.
ALOYSIUS T. KUNKEL
BY
William Oberland
ATTORNEY

United States Patent Office

Re. 24,704
Reissued Sept. 29, 1959

24,704

METAL WINDOW

Aloysius T. Kunkel, Akron, Ohio; Albert A. Kunkel, administrator of the estate of said Aloysius T. Kunkel, deceased Original No. 2,781,111, dated February 12, 1957, Serial No. 285,862, May 3, 1952. Application for reissue March 31, 1958, Serial No. 732,406

11 Claims. (Cl. 189—75)

Matter enclosed in heavy brackets [ ] appears in the original patent but forms no part of this reissue specification; matter printed in italics indicates the additions made by reissue.

This invention relates to metal windows.

Heretofore, metal windows have had the serious disadvantage of being subject to conduction of cold and heat through the metal of the frame from the exterior to the interior thereof. This condition has been particularly noticeable in cold weather, because cold conducted to the inner surface portion of the frame is carried inwardly of the window by convection currents and is likely to cause discomfort to persons located near the window. Moreover, the condition is often aggravated by the cold inner surfaces of the metal frame and other parts causing moisture of the relatively warmer interior air to condense thereon, and this moisture sometimes runs down the wall and causes damage to wallpaper, paint, varnish or woodwork. Another complaint in the past has been that there has been a substantial amount of heat loss outwardly through such metal windows.

One object of the invention is to provide a metal window which obviates or reduces to a minimum the conduction of cold or heat through the same.

Another object of the invention is to provide a simple and economical method for manufacturing metal framing of the character described which readily lends itself to continuous production of the insulated framing parts.

Another object of the invention is to provide an improved method for making insulated window or like frames of rigid and accurate construction utilizing economical extruded sectional metal requiring a minimum of parts to be assembled.

These and other objects of the invention will be manifest from the following brief description and the accompanying drawings.

Figure 1:
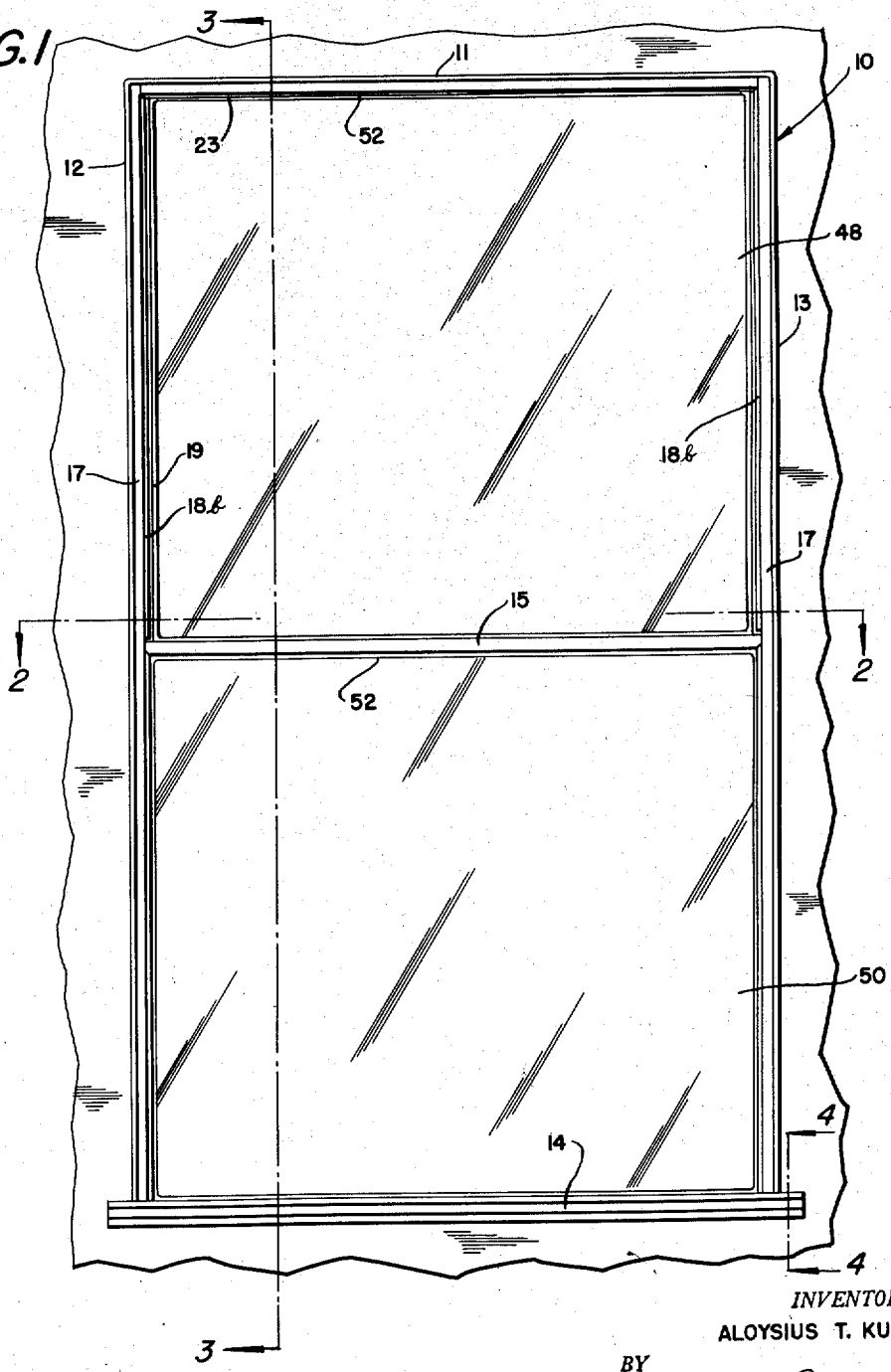
Figure 1 is a front elevation of the inner side of a window embodying the features of the invention.

Referring particularly to Figures 1 to 4 of the drawings, there is illustrated a window including a rectangular frame 10 of metal, such as aluminum or steel, said frame being composed of a head jamb 11 and side jambs

12 and 13, which may be formed of one length L of extruded sectional metal in a manner to be described later, and a bottom sill 14 of similar extruded sectional metal secured between the lower end portions of the side jambs. A lower sash 15 is vertically slidably mounted between removable inside stops 17, 17 and parting strips 18, 18 on the side jambs, and an upper sash 19 is similarly slidably mounted between said parting strips 18 and blind stops 20, 20 comprising inturned flanges on the side jambs.

The upper and lower sashes are inwardly removable as for cleaning or other purposes, in the manner disclosed in prior patent application Serial No. 17,502, filed on March 27, 1948, now abandoned. Accordingly, the upper and lower sashes 19 and 15 are vertically slidably engaged between oppositely disposed pairs of spring-type weather sealing strips 19a, 19a and 15a, 15a respectively, the strips 19a being in laterally inwardly stepped relation with respect to the strips 15a and upper sash 19 being correspondingly narrower than the lower sash 15. Both sashes are removable from the frame upon first removing the inner stops 17, the lower half 18a of the parting strip 18 being of reduced thickness with respect to the upper half 18b to permit removal of the relatively wider upper sash 19 in lowered position thereof.

The head jamb 11 has sash-receiving guide portions 22, 23 and 24 thereon the same as the guide portions 17, 18 and 20, respectively. The bottom rail 25 of the lower sash 15, in closed postion shown in Figures 1 and 3, yieldingly engages a weather sealing spring strip 26 along an outwardly presented face 27 of a stepped portion 28 of the sill 14.

In order to prevent conduction of heat and cold between outer and inner portions of the metal frame, and thereby to obviate the disadvantages enumerated above, the parting strips 18 of the side jambs and corresponding stops of the head 11 are made of non-heat conducting material, such as synthetic resin plastic, and rigidly secured to the jambs in overlying relation to a longitudinal split or slot 29 in relatively thin web portion or base 30 of said length L of sectional metal, dividing the same into inner and outer segments 31 and 32 of the same. For rigidly attaching the insulating strip portions 18 and 23 to the web 30 the strips may have in the outwardly presented faces 33 thereof parallel grooves 34, 34 in which complementally shaped parallel ribs 35, 35 are tightly received, said split 29 in the web being located between the ribs, whereby is obviated metal-to-metal contact between the inner and outer segments of said length L. Said insulating strip portions may be mechanically locked in place by having opposite relatively thin, yieldingly flexible side portions 36, 36 defined by the grooves 34, provided with longitudinally extending beaded portions 36a retained in complemental grooves 37, 37 in the ribs 35 by the inherent resiliency of the side portions 36.

Figure 3:
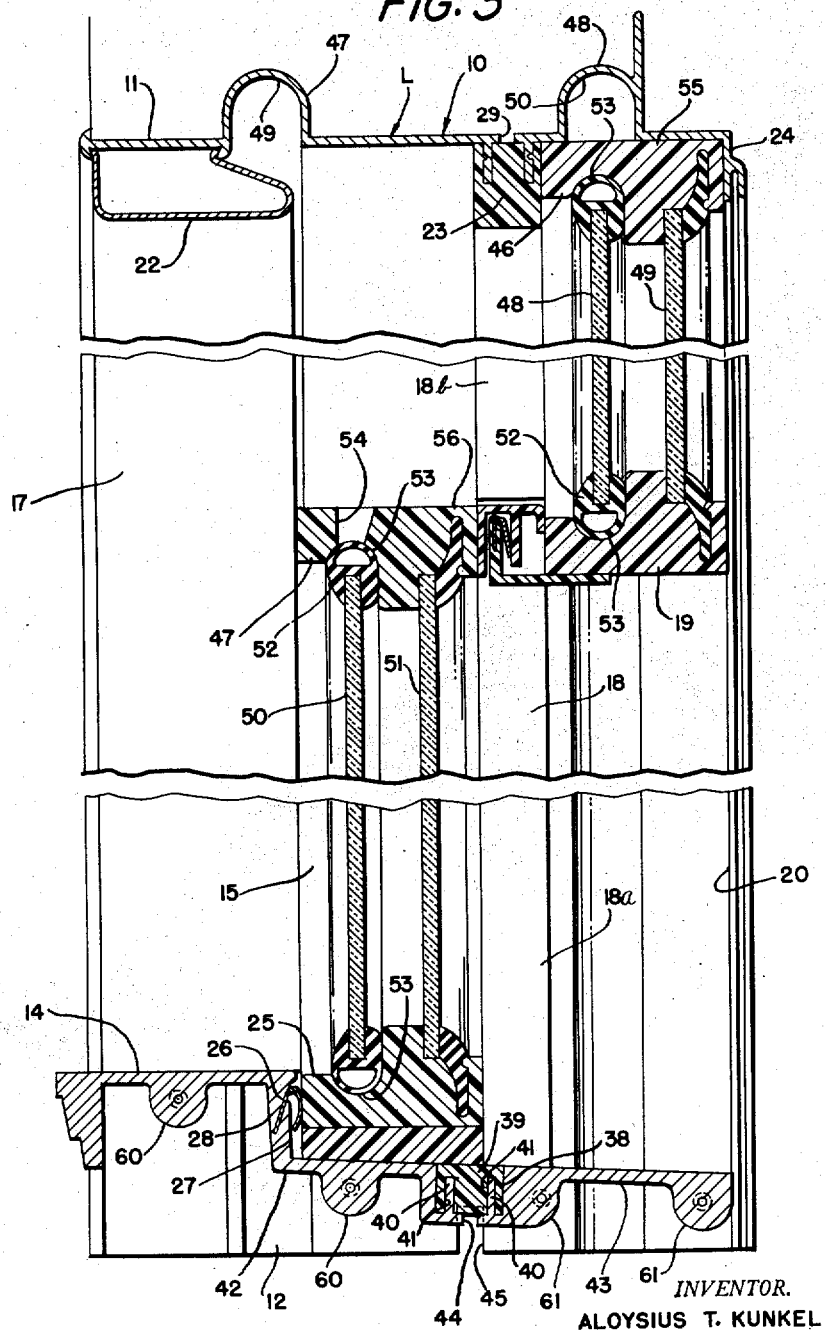
Figure 3 is an enlarged vertical cross-section, partly broken away, taken on the line 3—3 of Figure 1.

Similarly the bottom sill 14 is of extruded metal provided with an elongated recess 38 of square cross-section and has an insulating strip 39 of relatively hard synthetic resin material, as before, rigidly secured therein to be flush with the adjacent upper surface of the sill. Laterally spaced elongated ribs 40, 40 are complementally received in grooves 41, 41 to lock inner and outer segments 42 and 43, defined by a parting slot or cut 44 in the web, against lateral separation, said parting slot obviating metal-to-metal contact between said segments 42 and 43 in the manner previously described. As shown in Figure 3, the insulating strip 39 overlaps the side strips 18, and cut-outs 45 are provided in the lower ends of the side jambs, to prevent continuous metal-to-metal contact through adjoining portions of the sill and side jambs. It will be seen that the insulating strips 18, 23 and 39 are located generally in planes intermediate the planes of the upper and lower sashes 19 and 15, respectively.

Formed on the underside of each sill segment 42 and 43 may be laterally spaced pairs of rib portions 60, 60 and 61, 61, respectively, providing substantial bearing area at the ends of the sill, engaging the opposite inner faces of the side jambs, the sill being secured to the jambs by screws 62 received through apertures in the jambs and threaded into the respective ends of the ribs 60 and 61. This structure in conjunction with the integral web connections at the upper corners of frame 10 make the latter solid and rigid.

Figures 2, 4:
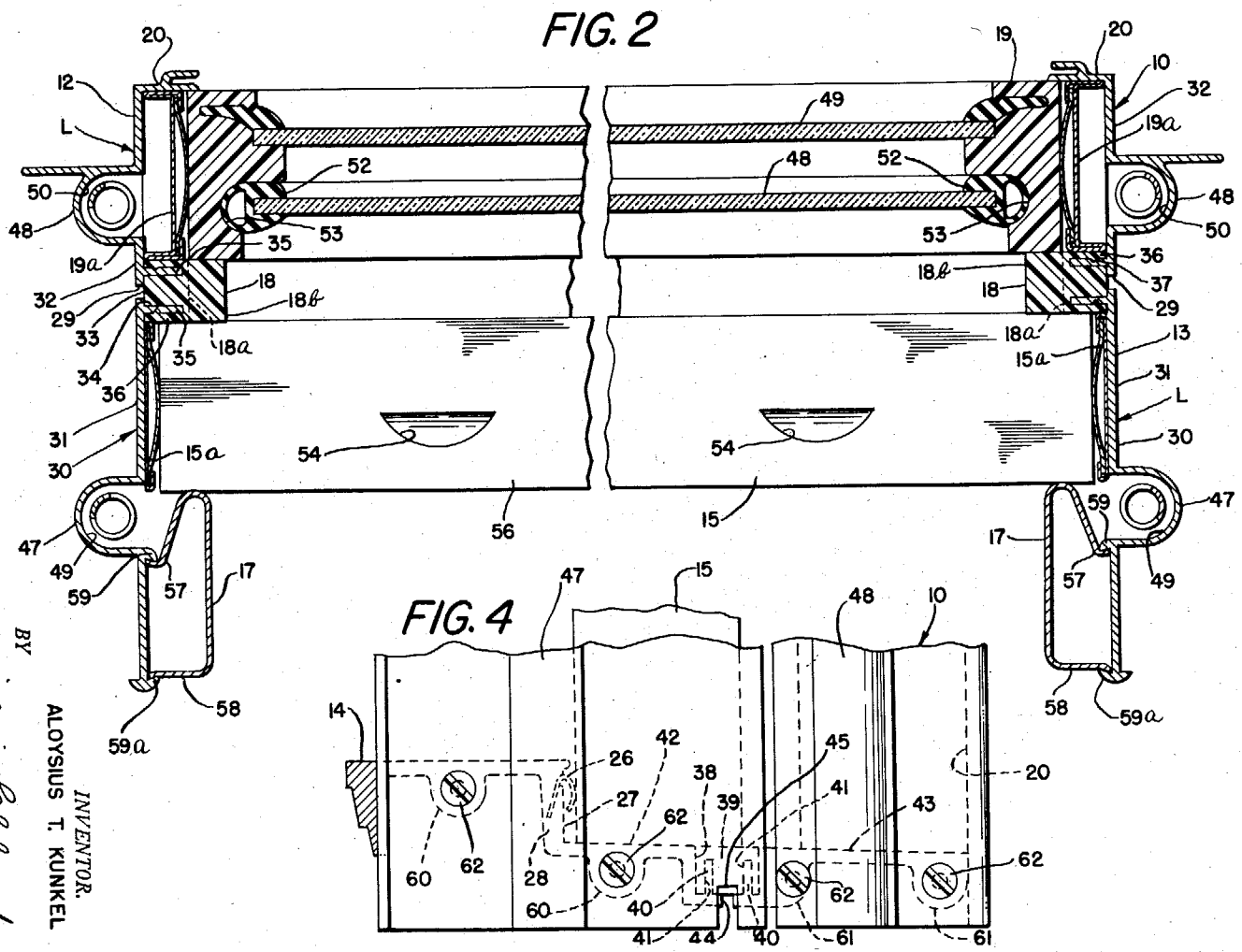
Figure 2 is an enlarged horizontal cross-section, partly broken away, taken on the line 2—2 of Figure 1.
Figure 4 is an enlarged fragmentary cross-section, taken on the line 4—4 of Figure 1.

For preventing conduction of cold and heat through the upper and lower sashes 19 and 15, the frames 46 and 47 thereof may be made of extruded insulating material, similar to the strips 18, 23, and 39, and each sash 19 and 15 may be provided with dual panes of glass 48, 49 and 50, 51 respectively. To facilitate washing the window the inner panes 48 and 50 are provided with hollow rubber or like resilient beading material 52 secured around the edges thereof and adapted to be yieldingly depressed in shallow rounded recesses 53 around the respective sash frames, as shown in Figures 1, 2 and 3. Finger-receiving holes 54 may be provided in top rails 55 and 56 of the upper and lower sashes 15 and 19, respectively, for initiating removal of the inner panes 48 and 50 thereof, as by yieldingly depressing the hollow beading 52 and urging the top portions of the panes inwardly of the window.

Said length L of jamb material may have thereon laterally spaced outwardly formed, hollow reinforcing portions 47 and 48, integral with the web 30, providing on the inner faces of the material elongated channels 49 and 50, which in the side jambs 12 and 13 may also serve as recesses for receiving sash weight cables or other elements of a counterbalancing device suitably connected to the respective sashes.

Said inside stops 17 and guide portion 22 of the head jamb are of thin metal, such as aluminum, formed generally channel shaped to provide spaced side flanges 57 and 58 which are yieldingly compressible to engage the edges thereof against inwardly oppositely undercut retaining rib portions 59 and 59a formed in the web 30 of the jamb material L.

Figure 5:
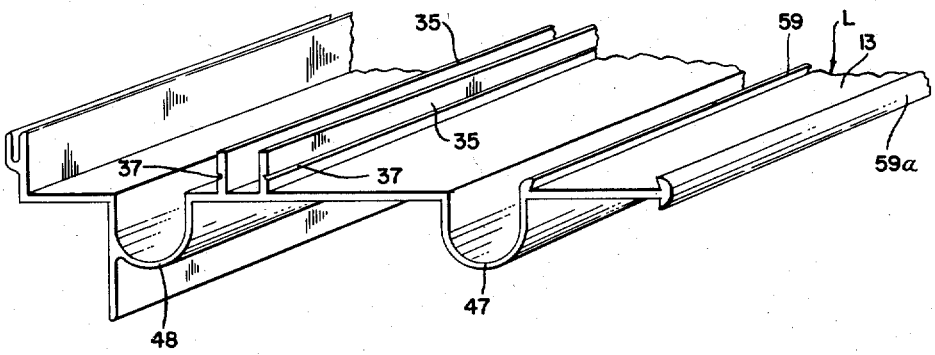
Figures 5, 6 and 7 are similar fragmentary perspective views illustrating three steps in a method of making heat and cold insulated window framing in accordance with the invention.
Figure 6:
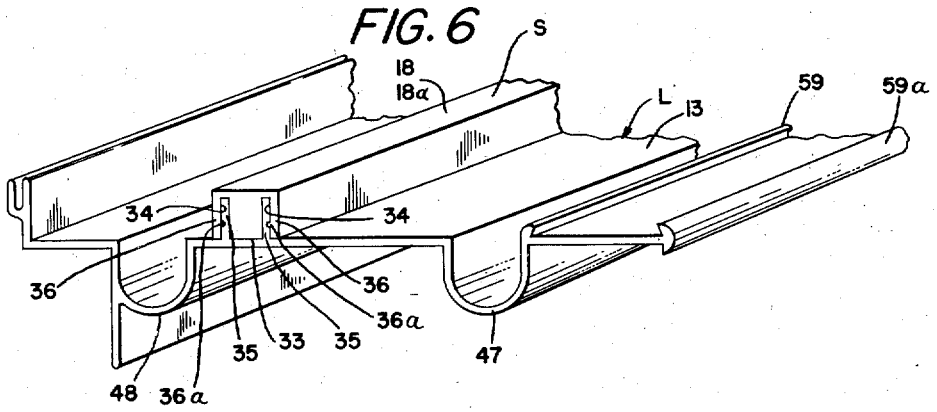

In practice of the method of making the frame 10 a length of sectional metal framing material L, of desired cross-section, as shown in Figure 5, is provided by known metal extrusion methods, the same having the laterally spaced ribs 35, 35 thereon as well as other elements as described above. Next, insulating strip portions S are pressed over the ribs 35 and locked in position as shown in Figure 6. The strip portions S may be all in one piece, or in segments corresponding to the parting strip portions 23, 18a and 18b. Suitable adhesive material, such as glue, may be utilized if necessary, to assure completely solid or rigid attachment of the plastic strip portions to the jambs.

Figure 7:
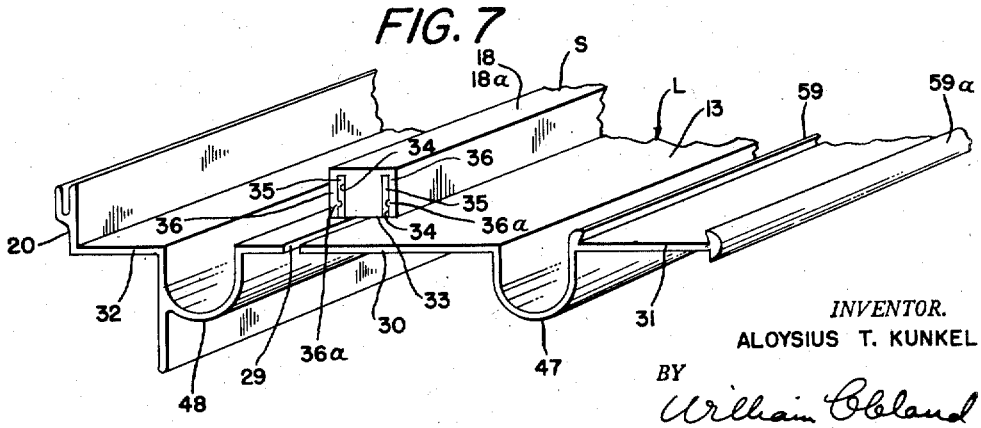

After the insulating strip portions S are fully secured to the frame member L the latter is placed on a suitable jig or fixture and a saw cut 29 of substantial width is made completely through the web 30 along the full extent of the member L, and intermediate the ribs 35, as shown in Figure 7.

Figure 8:
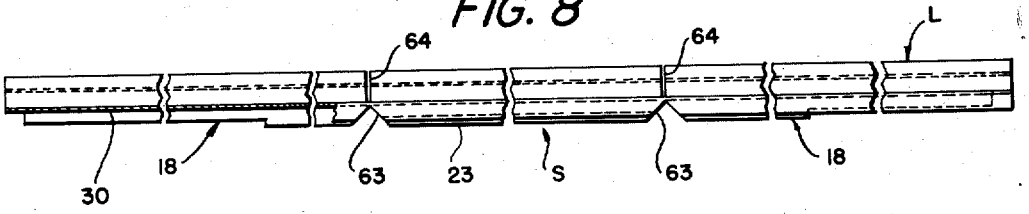
Figure 8 is a front edge view, partly broken away and in section and on a reduced scale, illustrating a cutting or notching step in the method of forming the framing material of Figure 7 into a window frame.

Now the frame member L is provided on the inner side thereof, on which strip portions S are located, with two longitudinally spaced ninety degree miter joint notches 63, through all projecting ribs including the strip portions S to the near face of the web 30 (see Figure 8). It may be desirable, however, to notch or bevel the plastic parts prior to attachment thereof to said frame member. Directly opposite the notches 63 two slits or narrow cuts 64 are made through all projecting portions, including ribs 47 and 48, on the other side of the length L to the corresponding face of the web 30. Portions of the parting strips 18 and corresponding portions of retaining ribs 35 thereof may be removed at the lower ends of the side jambs to permit the ends of the sill 14 to fit flatly against the web portions 30 of the side jambs (see Figures 3, 4, 7, 8 and 9).

Figure 9:
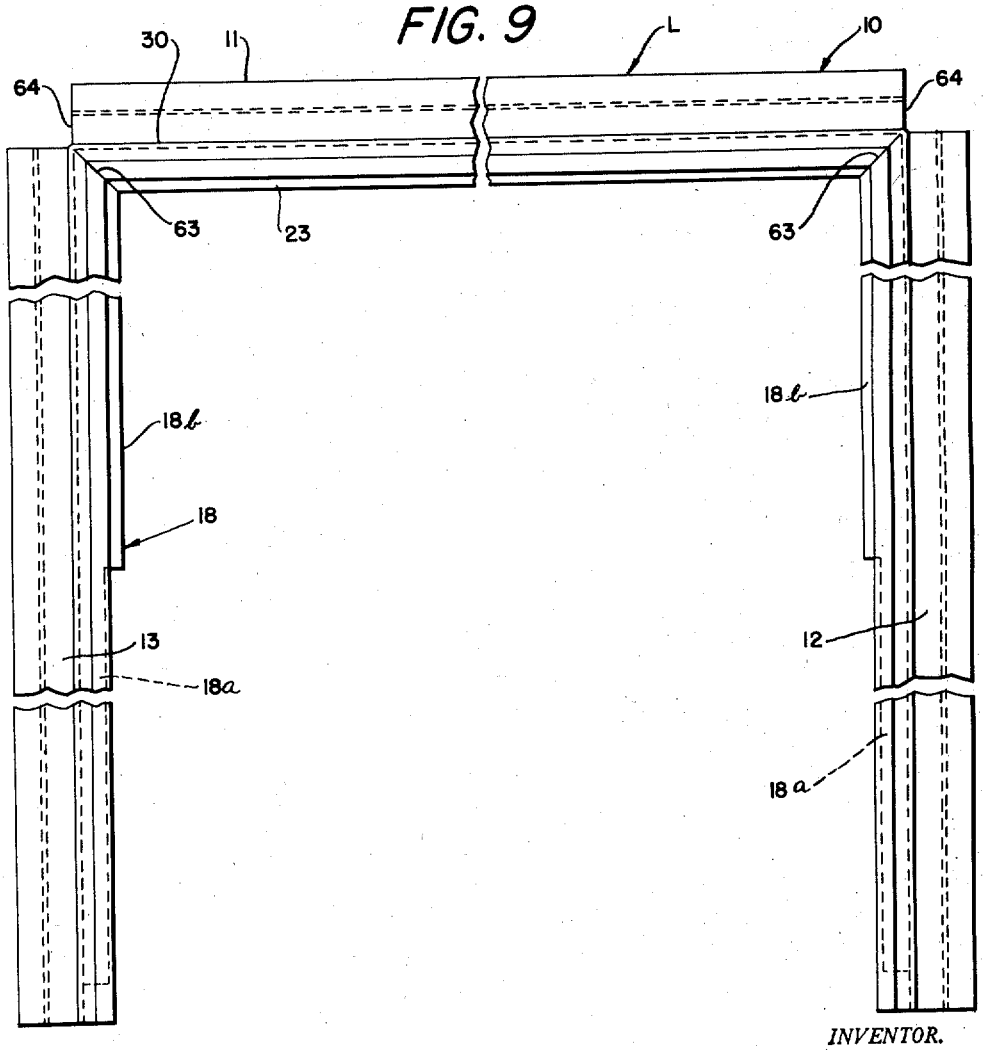
Figure 9 is a view corresponding to Figure 8, illustrating the step of forming the notched framing material to rectangular shape for corners of the window frame.

Placing the notched length L of Figure 8 in a bending device (not shown), ninety degree bends are made at said notched points, which are predeterminately located, to form the frame 10 integrally connected at upper corners of the frame through the corresponding portions of web 30, the insulating strip portions S and other inwardly presented projecting portions being neatly mitered at said corners as illustrated in Figure 9.

A length of sectional metal for the sill 14 is similarly assembled, with its insulating strip 39, and provided with a slot 44.

After drilling prelocated screw holes through the lower ends of the side jambs 12 and 13 are correspondingly located threaded holes in the sill ribs 60 and 61 it is an easy matter to secure the sill 14 to the side jambs by means of screws 62 as previously described. The sashes 19 and 15, as shown in Figures 1, 2 and 3, or any other suitable sashes may then be vertically slidably retained in the frame in the manner described above.

In use of the improved window, mounted in a wall opening in the usual manner of metal windows, heat and cold are prevented from passing through the frame because there is a substantially continuous slot or parting line around the same which interrupts metal-to-metal contact and because there is insulating strip material bridging the parting line at all points. This insulation not only obviates the usual discomfort of a cold metal window and the objectionable collection of moisture thereon as described above, but it also reduces to a minimum the loss of heat from the interior to the exterior of the frame.

Modifications of the invention may be resorted to without departing from the spirit thereof or the scope of the appended claims.

What is claimed is:

1. A metal frame for window or like closure panel means, comprising a frame member having enclosing sides connected at corners of the member, said sides each being of sectional shape defining web portions providing longitudinally extending panel seating portions presented inwardly of the frame for receiving closure panel means in the member and laterally spaced elongated retaining portions intermediate lateral side edges of each said side and projecting in the same direction angularly of the adjacent said web portions, and strips of substantially non-heat conducting material rigidly affixed to said retaining portions and forming an integrated unit therewith, said sides being laterally parted to substantial extent between said retaining portions along substantially the entire lengths of the sides to provide separate segments thereof, the spacing along the parting lines being sufficient to prevent substantial exchange of heat and cold between the parted segments.

2. A metal frame as set forth in claim 1, wherein said strips and the corresponding spaced retaining portions of the respective said sides have complementally interengaging means locking said segments and strips together as a unit.

3. A metal frame as set forth in claim 2, wherein at least some of said strips project freely inwardly of said frame member.

4. A metal frame as set forth in claim 3, said sides including a top part and opposite side parts composed of a single length of strip material and a bottom part of metal strip material secured between said side parts, said web portions of the respective sides being generally in a plane, said single length being inwardly notched substantially to said web portions at the corners of the frame and the web being bent at ninety degrees at said notches.

5. A metal frame as set forth in claim 4, said bottom part having apertured end portions flatly abutting the opposite inner faces of said side parts, and the side parts having securing screws received therethrough and threaded into said apertured end portions.

6. A metal frame as set forth in claim 1, at least certain of said strips projecting inwardly of said frame member and serving as parting strips for top and bottom window sashes received in the frame.

*7. A window of quadrilateral configuration and having a transverse thickness between the inner and outer surfaces thereof, comprising; a first metallic frame element including a sash seat having its transverse width defined by an outer stop and a longitudinal edge spaced therefrom; a second metallic frame element transversely spaced from said first element and including a sash seat having its transverse width defined by an inner stop and a longitudinal edge spaced therefrom; and a rigid non-metallic insulating strip having opposed portions that are mechanically interlocked with said longitudinal edges disposed adjacent said opposed portions; said rigid strip supporting said respective longitudinal edges in transversely spaced apart relationship with each other; said insulating strip having opposed parallel surfaces that project beyond said sash seats at right angles therewith to form stop surfaces for said seats.*

*8. The device of claim 7 further characterized by the fact that said sash seats are disposed in substantially coplanar relationship with each other.*

*9. A window of quadrilateral configuration and having a transverse thickness between the inner and outer surfaces thereof, comprising; a first metallic frame element including a sash seat having its transverse width defined by an outer stop and a longitudinal edge spaced therefrom; a second metallic frame element transversely spaced from said first element and including a sash seat having its transverse width defined by an inner stop and a longitudinal edge spaced therefrom; and a rigid non-metallic insulating strip having opposed portions that are mechanically interlocked with said longitudinal edges disposed adjacent said opposed portions; said rigid strip supporting said respective longitudinal edges in transversely spaced apart relationship with each other; said insulating strip having opposed parallel surfaces.*

*10. A window frame of the charcater described, comprising; an outer metallic frame element having a transverse width defined by laterally spaced edge surfaces; an inner metallic frame element having a transverse width defined by laterally spaced edge surfaces and being spaced transversely of said outer frame; first and second sash seats defined by said outer and inner frame members and each having a transverse width defined by one said lateral edge of each said frame; and a rigid elongate insulating strip interposed between and mechanically interconnected with said lateral edge surfaces of said first and second frame elements said rigid strip supporting said frame elements in transversely spaced apart relationship with each other; said strip having opposed planar surfaces that define stop surfaces for said first and second sash seats.*

*11. A window frame of the character described, comprising; an outer metallic frame element having a transverse width defined by laterally spaced edge surfaces; an inner metallic frame element having a transverse width defined by laterally spaced edge surfaces and being spaced transversely of said outer frame; first and second sash seats defined by said outer and inner frame members and each having a transverse width defined by one said lateral edge of each said frame; and an insulating strip interposed between and mechanically interconnected with said first and second frame elements; said strip having opposed planar surfaces that define stop surfaces for said first and second sash seats; said mechanical interconnection between said strip and said first and second frame elements including at least one rib and groove connection therebetween.*

References Cited in the file of this patent or the original patent

UNITED STATES PATENTS

| | | |
|---|---|---|
| 412,751 | Henderson | Oct. 15, 1889 |
| 1,552,748 | Kopplinger | Sept. 8, 1925 |
| 1,794,809 | Van Alen | Mar. 3, 1931 |
| 2,100,556 | Van Fleet | Nov. 30, 1937 |
| 2,136,273 | Chaffee et al. | Nov. 8, 1938 |
| 2,185,904 | Stowe | Jan. 2, 1940 |
| 2,198,436 | Hoffman | Apr. 23, 1940 |
| 2,219,594 | Lang | Oct. 29, 1940 |
| 2,239,758 | Scherer | Apr. 29, 1941 |
| 2,614,665 | Floyd | Oct. 21, 1952 |
| 2,711,232 | Toth | June 21, 1955 |

FOREIGN PATENTS

| | | |
|---|---|---|
| 575,428 | Great Britain | Feb. 18, 1946 |